Feb. 15, 1949.  S. H. ZEEB  2,461,863

COUPLING

Filed Dec. 6, 1945

Inventor

STANLEY H. ZEEB

By Berman & Patek

Attorneys

Patented Feb. 15, 1949

2,461,863

UNITED STATES PATENT OFFICE 2,461,863

COUPLING

Stanley H. Zeeb, Jackson, Mich., assignor, by mesne assignments, to Aeroquip Corporation, Jackson, Mich., a corporation of Michigan Application December 6, 1945, Serial No. 633,189

7 Claims. (Cl. 285—122)

The present invention relates to a coupling and more particularly couplings of the quick connecting and disconnecting type.

Couplings of the quick connecting and disconnecting type are usually complicated by somewhat expensive connecting and locking features. A conventional and simple form of a locking connection is one where a female member in the form of a nut is screwed onto a threaded male member. However, where relatively soft metals, such as aluminum alloys, are employed, it is difficult to provide satisfactory threads unless careful and expensive machining operations are resorted to. According to the present invention, the difficulty of forming threads is eliminated by cutting a spiral groove in a male coupling member and anchoring one end of a spiral wire in a female coupling member, whereby the parts may be readily screwed together.

Accordingly, it is an object of the present invention to provide a coupling of the character described.

Another object of the invention is to provide in a coupling of the character described, a locking shoulder for placing the wire in shear to resist separation of the coupling.

Figure 1:
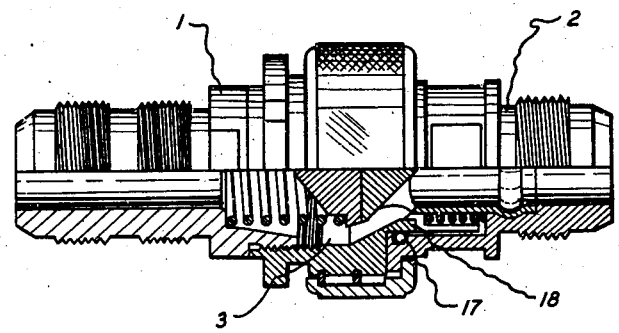
Figure 2:
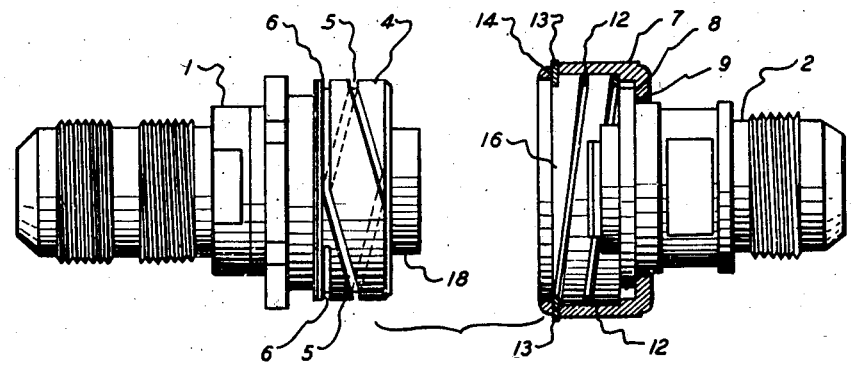
Figure 3:
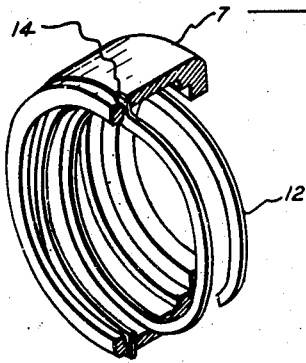

These and other objects residing in the combination, arrangement and construction of the parts will be apparent from the following specification when taken with the accompanying drawing, in which Fig. 1 is a side elevation of the invention, partly in section and coupled together, Fig. 2 is a view of the coupling according to present invention, uncoupled and partly in section, and Fig. 3 is a perspective view of the coupling nut partially broken away to show the spring wire insert.

Referring particularly to the drawing, the reference characters 1 and 2 indicate body portions which are to be coupled together. The body portions 1 and 2 contain sealing mechanism 3 for the purpose of sealing off the open ends of the tubes to which the couplings are attached when the body portions 1 and 2 are separated. However, the sealing mechanism is no part of the present invention and is more particularly disclosed in the co-pending application of Mark A. Deming, executed November 21, 1945, filed December 6, 1945, Serial No. 633,188, now Patent No. 2,436,206, for Self-sealing couplings.

Attached to and comprising a part of body portion 1 is a male or connecting member 4 in which there are cut two spiral grooves 5. Each of the spiral grooves terminates at the end thereof away from the outer end of the male connector 4 in a circumferentially extending groove 6.

The body portion 2 has as a part thereof a loosely mounted rotatable nut 7 which is restricted against movement toward the body portion 1 by complementary contacting shoulders 8 and 9 on the nut 7 and body portion 2. The coupling nut 7 is provided with a pair of internal helical wires 12. The wires 12 as disclosed particularly in Fig. 3 are each provided, at the outer end of the nut 7, with a radially extending prong 13 extending through an opening 14 in the nut 7. The prongs 13 provide anchors for the outer ends of the helical wires 12 and maintain them against displacement. The remaining portion of each helical wire 12 is loosely disposed within the shell on the nut 7.

When it is desired to couple the body portions 1 and 2 together, it is merely necessary to bring the nut 12 relatively to the male connector 4 and screw the nut 12 on the male connector 4. The helical wires 12 mate with the spiral grooves 5 in the male connector 4 in the manner of the usual conventional threads. As the ends of the helical wires 12 away from the prongs 14 are not supported, they follow freely along into the grooves 5. As will be observed from the drawings, the length of each wire 12 is substantially 360° of arc, and the length of each helical groove 5 is substantially only 180° of arc. It follows that after substantially 180° of rotation of the nut 7 with respect to male connector 4, after the wires 12 have engaged the grooves 5, the leading parts of the wires 12 will enter part way into the circumferentially extending portions 6 of the grooves 5 and catch therein, due to the angular relation of the grooves 5 and 6. In this position, the annular shoulder 16, on the nut 7, in alignment with which the prongs 13 are arranged, will lie against the portions of the wires 12 in the grooves 6, to provide a shearing resistance to separation of body portions 1 and 2.

When the body portions 1 and 2 are coupled together, a seal to prevent the escape of fluid from within the body portions 1 and 2 is provided by the sealing ring 17 carried by the body portion 2, engaging with the annular flange 18, comprising a part of the male connector 1. The sealing ring 17 is of the O type, which is preferably, though not necessarily, of synthetic rubber and is of a desired consistency so as to cause the fluid pressure within the system to increase the effectiveness of the seal provided by the ring. The clearance between the surfaces sealed by the ring 17 should be a minimum.

While there has been shown a rectangular wire, it is contemplated cross sectional configurations may be implied. Other changes in the specific details may be made. Therefore, I do not desire to be limited except by the scope of the following claims.

Having thus described my invention, what I desire to secure by Letters Patent and claim is:

1. A coupling of the character described, comprising two body portions, a male connector on one of said body portions, said male connector having a spiral groove therein terminating at its end away from the outer end of the connector in a circumferentially extending groove, a female connector on the other of said body portions, said female connector being in the form of a rotatably mounted nut, a spiral thread simulating wire disposed in said nut, and means anchoring the leading end of said wire to said nut, whereby said female connector may be screwed on said male connector.

2. A coupling of the character described, comprising two body portions, a male connector on one of said body portions, said male connector having a spiral groove therein terminating at its end away from the outer end of the connector in a circumferentially extending groove, a female connector on the other of said body portions, said female connector being in the form of a rotatably mounted nut, a spiral wire disposed in said nut, a prong on one end of said spiral wire, extending in a radial direction, and a hole defined by said nut, into which said prong extends to anchor said spiral wire.

3. The invention as defined in claim 2, wherein the end of the spiral wire having the prong thereon is the end adjacent the open end of said nut.

4. A coupling of the character described, comprising two body portions, a male connector on one of said body portions, said male connector having a spiral groove therein terminating at its end away from the outer end of the connector in a circumferentially extending groove, a female connector on the other of said body portions, and a spiral wire anchored in said female connector, whereby said female connector may be screwed onto said male connector by threading said wire into said groove.

5. The invention as defined in claim 1, wherein on the nut is a shoulder which is disclosed behind the portion of the wire in the circumferentially extending extension of the groove, whereby said shoulder bears against the wire to provide a shearing resistance to the separation of the body portions.

6. The invention as defined in claim 2, wherein there is provided an annular shoulder on said nut adjacent the prong, and a circumferentially extending extension of the groove, into which a portion of the wire extends upon coupling of the body portions, whereby the shoulder is moved behind the portion of the wire in the circumferentially extending extension of the groove to resist separation of the two body portions.

7. The invention as defined in claim 4, having means on the female connector for bearing against a portion of the wire in the groove when the body portions are in coupled relation for providing a shearing resistance to separation of the body portions.

STANLEY H. ZEEB.

REFERENCES CITED

The following references are of record in the file of this patent:

UNITED STATES PATENTS

| Number | Name | Date |
| --- | --- | --- |
| 175,562 | Havey | Apr. 4, 1876 |
| 455,633 | Messinger | July 7, 1891 |
| 887,864 | Steese | May 19, 1908 |
| 2,341,670 | Stinson | Feb. 14, 1944 |